United States Patent

Ljung

[15] 3,696,363
[45] Oct. 3, 1972

[54] FAILURE INDICATING ARRANGEMENTS FOR GYROSCOPES

[72] Inventor: Bo Hans Gunnar Ljung, Canoga Park, Calif.

[73] Assignee: AGA Aktieb lag, Lidingo, Sweden

[22] Filed: Nov. 10, 1969

[21] Appl. No.: 875 406

[30] Foreign Application Priority Data

Nov. 22, 1968 Sweden ................. 15888/68

[52] U.S. Cl. ............... 340/248 B, 340/198, 340/253 B
[51] Int. Cl. ........................................... G08b 21/00
[58] Field of Search 340/253 B, 253 C, 248 C, 248 B,
340/248, 213, 373, 198, 181; 318/563

[56] References Cited

UNITED STATES PATENTS 2,664,558  12/1953  Konet et al. ............. 340/253 B
2,759,177  8/1956   Hightower ............... 340/253 C
2,979,707  4/1961   Seifried et al. .......... 340/253 B Primary Examiner—John W. Caldwell
Assistant Examiner—Daniel Myer
Attorney—Larson, Taylor and Hinds

[57] ABSTRACT

An arrangement for indicating failures in the three-phase voltage supply for a gyro motor of the induction type includes a servo motor connected in parallel with the gyro motor for controlling movement of an indicator vane. The servo motor includes a pair of windings which are respectively connected between a common phase and each of the remaining phases of the three-phase supply. These windings produce a torque which acts in opposition to the torque produced by a spring which normally biases the vane into a failure-indicating position.

4 Claims, 5 Drawing Figures

PATENTED OCT 3 1972 3,696,363

INVENTOR
BO HANS GUNNAR LJUNG

BY Larson and Taylor
ATTORNEYS 3,696,363

FAILURE INDICATING ARRANGEMENTS FOR GYROSCOPES

FIELD OF THE INVENTION

The present invention relates to gyroscopes and to the motor drives therefor and more particularly to an indicating device for indicating a failure in the voltage supply for the gyro drive motor.

BACKGROUND OF THE INVENTION

In a common gyro system a gyroscope is driven by a gyro motor of the induction type which is connected to a three-phase supply and includes a short-circuited rotor. Induction motors of this type are often designed for single-phase operation and thus even where there is failure of one phase of the three-phase supply the motor may still provide reliable operation of the gyro. However, if one phase is disconnected when the gyro motor is started up the gyro motor will not provide acceptable operation of the gyro. Thus there was a need, prior to the present invention, for an arrangement for indicating a failure in the voltages supplied to the gyro where such a failure would affect the reliability and accuracy of the operation of the gyro.

SUMMARY OF THE INVENTION

In accordance with the present invention, a failure indication arrangement for a gyroscope motor is provided which indicates a failure in the voltage supply for the gyro motor under circumstances where is failure affects the operation of the gyro and which does this in an effective and reliable manner.

In accordance with a presently preferred embodiment of the invention a servo motor of the induction type is connected in parallel with the gyro motor to provide an indication of failures of the type described. The servo motor includes first and second stator windings which are connected to the three phases of the voltage supply. The stator windings are each connected in series with a corresponding capacitor between a common phase and individual ones of the remaining two phases of the three-phase supply.

The indicator arrangement preferably includes a pinion secured to the rotor of the servo motor and a rack in the form of a gear segment or sector gear coupled to an indicator vane. A spring normally biases the vane into a position where the vane can be viewed through an aperture, the appearance of the vane in the aperture indicating a failure. Under normal operating conditions, the counter-torque produced by the servo motor is such as to cause the pinion to drive the rack against the biasing force of the spring to a position wherein the vane is no longer visible through the aperture. The gyro motor will operate with negligible loss of speed under single-phase conditions so that if, during normal operation, there is a failure in one of the phases, the torque produced by the servo motor will be sufficient to maintain the indicator vane in the non-visible position thereof. If, however, one of the phases is disconnected when the gyro motor is started up, the induced voltages in the servo motor will act in opposition to each other and the spring will cause positioning of the vane in the viewing aperture to indicate a failure.

Other features and advantages of the invention will be set forth in or apparent from the detailed description of a preferred embodiment thereof found hereinbelow.

DESCRIPTION OF A PREFERRED EMBODIMENT

Figure 1:
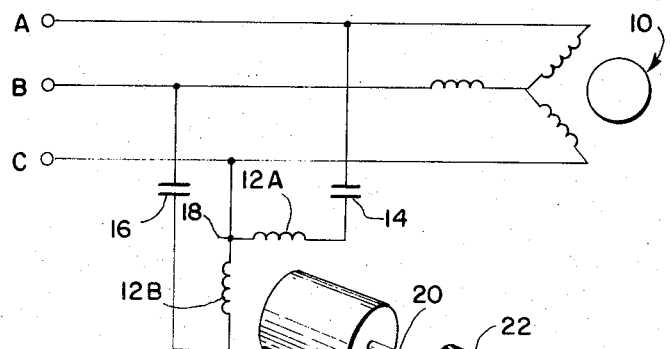
FIG. 1 is a schematic perspective view of a presently preferred embodiment of the invention.

Referring to FIG. 1, a gyro system includes an induction motor generally denoted 10 and including a cage or short-circuited rotor. Gyro motor 10 is Y-connected to the phase conductors A, B and C of a voltage supply network. A failure indicating device in accordance with the present invention includes a servo motor 12 of the induction type which is connected in parallel with gyro motor 10. Servo motor 12 includes a first winding 12A which is connected in series with a capacitor 14 to phase conductor A and a second winding 12B connected in series with a capacitor 16 to phase conductor B. The junction between windings 12A and 12B, denoted 18, is connected to the third phase conductor C.

The rotor of servo motor 12 is coupled to a shaft 20 to which is secured a pinion 22. Pinion 22 engages a rack in the form of a sector gear 24 which, under normal conditions, is biased against a stop 28 by a spring 26. Rack 24 is pivotable about a shaft 30 and angular movement thereof results in corresponding angular movement of an indicator vane 32 which is secured to the other end of shaft 30. Vane 32 cooperates with an aperture 34 to provide an indication of failures of the type described, vane 32 indicating such a failure in the position shown, that is, when the vane 32 is visible through aperture or window 34. The phase sequence of the voltages applied to servo motor 12 is such that servo motor 12 will cause rotation of rack 24 against the biasing action of spring 26 to a position wherein rack 24 engages a second stop 36, under normal operating conditions.

Considering the operation of the arrangement shown in FIG. 1, when voltages are present on all three phase conductors A, B, C, the phase voltages are applied to stator windings 12A and 12B of servo motor 12 to cause rotation of shaft 20. Pinion 22 secured to shaft 20 will rotate until rack 24 engages stop 36. Indicator vane 32 is not visible through aperture 34 for this position of rack 24. If a failure occurs in one of the three phases of the supply, the voltages that will be induced in windings 12A and 12B will still be sufficient to maintain rack 24 in engagement with stop 36 so that indicator vane 32 still cannot be seen. The phase displacement provided by windings 12A and 12B together with capacitors 14 and 16 is such that the resultant torque produced will maintain vane 32 in the non-visible position thereof. As stated hereinabove, the gyro motor 10 is adapted to operate under single-phase conditions without a perceptible change in speed. Thus the gyro will operate reliably under these circumstances and consequently the phase displacements discussed above are chosen such that no failure is indicated. However, on the other hand, if an attempt is made to start up the gyro motor 10 with one phase thereof disconnected or faulty, gyro motor 10 will not start and the indication produced by the gyroscope will be unsatisfactory. Under these circumstances the induced voltages discussed hereinabove are not produced and servo motor 10 does not produce an output torque. Thus rack 24 will be biased against stop 28 by spring 26 and vane 32 will be visible through aperture 34 to provide an indication that a failure has occurred.

Figure 2:
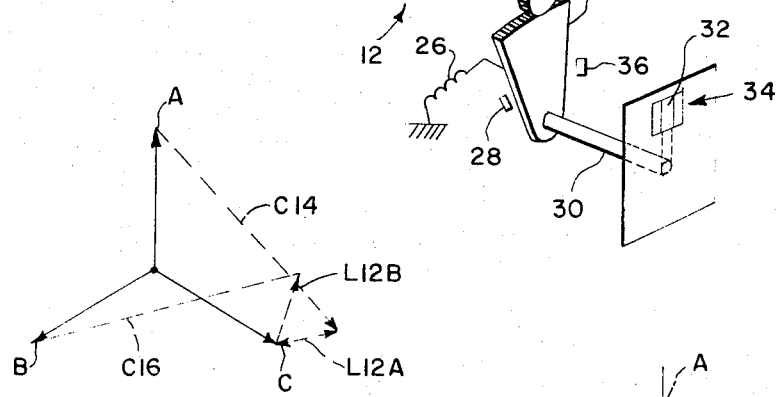
FIGS. 2 to 5 are phasor diagrams representing the voltages induced in the stator windings of the servo motor under various operating conditions.
Figure 3:
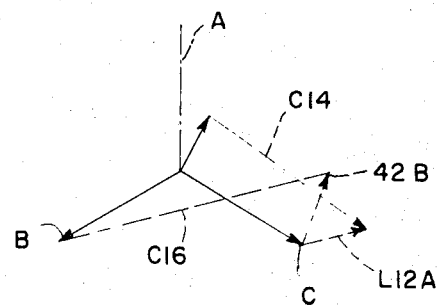
Figure 4:
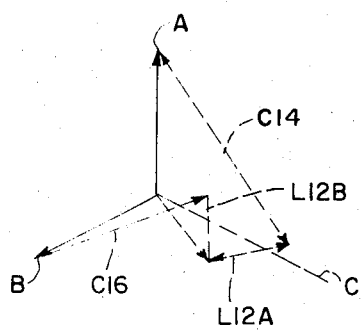
Figure 5:
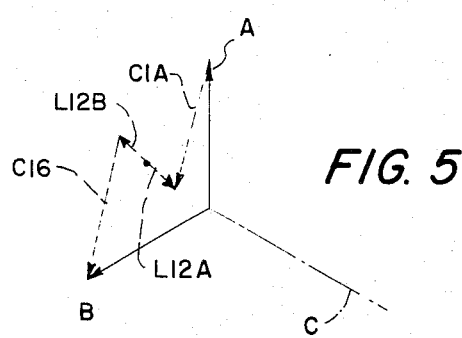

The operation described hereinabove can perhaps be better understood from a consideration of the phasor diagrams shown in FIGS. 2 to 5. FIG. 2 illustrates the voltage conditions present under normal operating conditions and under these circumstances the phase voltages on conductors A, B and C are of equal magnitude. By suitable proportion of the values of the inductances of windings 12A and 12B and the capacitances of capacitors 14 and 16, the voltages L12B and L12A may be made to differ in phase by approximately 90° so that maximum torque is produced. FIG. 3 illustrates a voltage condition wherein phase A is interrupted while the gyro motor 10 is still operating. The induced voltages L12A and L12B across windings 12A and 12B produced by rotation of gyro motor 10 are of such a magnitude and relative phase that the resultant torque produced thereby is sufficient to overcome the biasing forces of spring 26 and thus to maintain indicator vane 32 in a position out of view through aperture 34. Similarly, as illustrated in FIG. 4, the induced voltages across windings 12A and 12B for a fault on conductor C occurring during rotation of gyro motor 12 are sufficient to produce a sufficient torque to retain vane 32 in the "non-failure" position thereof. However, on the other hand, where, the example, phase C is disconnected when or before gyro motor 10 is started up, the voltages L12A and L12B across windings 12A and 12B will differ in phase by 180° and no resultant torque will be produced. Under these circumstances spring 26 will cause positioning of vane 32 in aperture 34 to indicate a failure.

It will be appreciated from the foregoing that a failure indication is provided by vane 32 only under selected circumstances such as, for example, where the gyro motor 10 does not start or the speed of rotation thereof is substantially reduced. On the other hand, no failure indication is produced where one of the phases is interrupted during operation of the gyro motor 10, experiments having shown that for a circuit arrangement of the type described hereinabove the speed of rotation of the gyro motor is reduced by only approximately 1 percent for single-phase operation and thus that the indication provided by the gyro under these circumstances is still reliable. It is also noted that a failure indication will be provided if the gyro motor 10 is connected in the wrong phase sequence. A failure indication should be provided under these circumstances in that even if the gyro motor 10 starts running, the rotation of the rotor is in the wrong direction.

Although the present invention has been described relative to a specific exemplary embodiment thereof, it will be understood by those skilled in the art that modifications and variations can be effected in the exemplary embodiment without departing from the scope and spirit of the invention.

I claim:

1. A failure indicating and torque sustaining arrangement for a gyro including a gyro motor and a three-phase supply for said gyro motor, said arrangement comprising a servo motor connected in parallel with said gyro motor and including first and second stator windings, means for connecting said first stator winding across one phase of said three-phase supply and a further phase of said supply and for connecting said second stator winding across the remaining phase of said supply and said further phase, and indicator means responsive to said servo motor, said arrangement further comprising a first capacitor connected in series with said first winding and a second capacitor connected in series with said second winding.

2. A failure indicating arrangement as claimed in claim 1 wherein said indicator means comprises drive means responsive to the rotation of said servo motor and driven means, responsive to said drive means, for indicating, in accordance with the angular position thereof, whether the output torque of said servo motor exceeds a predetermined value.

3. A failure indicating arrangement as claimed in claim 2 wherein said drive means includes a pinion secured to the rotor of said servo motor and said driven means includes a rack comprising a sector gear driven by said pinion, and an indicator vane coupled to said rack.

4. A failure indicating arrangement as claimed in claim 3 further comprising spring means for producing a torque acting in opposition to the output torque of said servo motor and means defining an aperture for cooperating with said indicator vane and said spring means so that said indicator vane be viewed through said aperture for values of servo motor output torque below a predetermined value.

* * * * *